US012410657B2

(12) United States Patent
Fang (10) Patent No.: US 12,410,657 B2
(45) Date of Patent: Sep. 9, 2025

(54) TELESCOPING GATE BRACE

(71) Applicant: Home Depot Product Authority, LLC, Atlanta, GA (US)

(72) Inventor: Shih-Hao Fang, Taipei (TW)

(73) Assignee: Home Depot Product Authority, LLC, Atlanta, GA (US)

( * ) Notice: Subject to any disclaimer, the term of this patent is extended or adjusted under 35 U.S.C. 154(b) by 598 days.

(21) Appl. No.: 17/705,562

(22) Filed: Mar. 28, 2022

(65) Prior Publication Data

US 2023/0304357 A1   Sep. 28, 2023

(51) Int. Cl.
*E06B 11/02* (2006.01)
*E06B 3/70* (2006.01)
*F16B 7/10* (2006.01)
*E04H 17/00* (2006.01)

(52) U.S. Cl.
CPC ............... *E06B 11/02* (2013.01); *F16B 7/10* (2013.01); *E04H 17/013* (2021.01); *E06B 2003/7098* (2013.01)

(58) Field of Classification Search
CPC ...... E04H 17/013; E04B 11/02; E04B 11/022; E04B 11/023; E04B 11/025; E04B 11/026; E04B 11/027; E04B 11/028; E06B 2003/7098; F16B 7/06; F16B 7/10; Y10T 403/32491; Y10T 403/7084
USPC .... 403/109.4, 379.3; 256/30, 31, 35, 63, 64, 256/73; 248/354.1, 354.3, 354.6
See application file for complete search history.

(56) References Cited

U.S. PATENT DOCUMENTS

| | | | | |
|---|---|---|---|---|
| 1,298,072 A | * | 3/1919 | McNabney et al. | E06B 11/02 256/73 |
| 1,394,479 A | * | 10/1921 | Ewald | E06B 11/02 256/73 |
| 2,245,826 A | * | 6/1941 | Rowe | E06B 11/02 256/73 |
| 2,500,236 A | | 3/1950 | Anderson | |
| 3,014,701 A | * | 12/1961 | De Vilbiss | E04H 17/08 256/35 |
| 3,229,950 A | * | 1/1966 | Macrobbie | E04G 21/26 248/354.5 |
| 3,300,941 A | * | 1/1967 | Heirich | E04F 10/08 403/109.4 |
| 4,987,941 A | * | 1/1991 | Wold | E04F 21/0007 160/130 |

(Continued)

OTHER PUBLICATIONS

International Search Report and Written Opinion of international application No. PCT/US2023/065028, mailed Jul. 21, 2023, 11 pp.

*Primary Examiner* — Josh Skroupa
(74) *Attorney, Agent, or Firm* — Greenberg Traurig, LLP (57) ABSTRACT

A telescoping gate brace is configured to be mounted on a wooden gate. The telescoping gate brace has a first rod, a second rod, a securing component, a first fixing assembly, a connector, and a second fixing assembly. The first rod and the second rod are movably sleeved with each other. The securing component is mounted on the first rod and the second rod, thereby securing a total length of the first rod and the second rod. The first fixing assembly is mounted on the first rod and the wooden gate. The connector is mounted on the second end. The second fixing assembly is mounted on the connector and the wooden gate. A distance between the second end and the second fixing assembly is adjustable via the connector.

19 Claims, 7 Drawing Sheets (56) References Cited

U.S. PATENT DOCUMENTS

| | | | |
|---|---|---|---|
| 5,468,241 A * | 11/1995 | Metz-Stavenhagen | F16B 7/06 |
| | | | 606/319 |
| 5,716,041 A | 2/1998 | Groves | |
| 6,751,906 B2 | 6/2004 | Bass | |
| 6,854,222 B2 * | 2/2005 | Hansort | E04G 21/26 |
| | | | 403/258 |
| 9,458,667 B2 * | 10/2016 | Bugh | E06B 11/02 |
| 9,512,674 B2 * | 12/2016 | Keudell | E06B 11/02 |
| 10,662,701 B1 * | 5/2020 | Penner | E06B 11/02 |
| 11,066,874 B1 * | 7/2021 | Penner | E06B 11/027 |
| 11,649,841 B2 * | 5/2023 | Seibert | F16B 7/105 |
| | | | 403/373 |
| 12,215,512 B2 * | 2/2025 | Cigala | E04G 25/06 |
| 2012/0144745 A1 | 6/2012 | Yates | |
| 2016/0108668 A1 * | 4/2016 | Volin | E06B 11/02 |
| | | | 256/73 |
| 2023/0340835 A1 * | 10/2023 | Wang | E06B 11/02 |

* cited by examiner

TELESCOPING GATE BRACE

BACKGROUND OF THE INVENTION

1. Field of the Invention

The present invention relates to a telescoping gate brace, especially to a support mounted on a wooden gate to prevent the wooden gate from sagging.

2. Description of the Prior Arts

A wooden gate is made by assembling wooden boards, but the wooden gate may sag because the wooden boards will loosen after being used for a long time. As being sag, the wooden gate may deform and a gap may form between the wooden gate and a door frame, which makes the wooden gate unable to be closed tightly.

Therefore, a telescoping gate brace may be mounted on the wooden gate to prevent the wooden gate from sagging. Conventionally, a telescoping gate brace comprises two corner braces, a steel cable, and two clamps. When setting the telescoping gate brace, the two corner braces are mounted on two opposite corners of the wooden gate. Precisely, one of the corner braces is mounted on an upper corner that is close to the door frame, and the other corner brace is mounted on a lower corner that is away from the door frame. The steel cable is connected to the two corner braces, and at least one end of the steel cable is connected to the corner brace via a turnbuckle. To correspond to door gates of different dimensions, the steel cable can be folded in a suitable length, and then the two clamps secure the folded steel cable and thereby maintain the length. Finally, tighten the steel cable via adjusting the turnbuckle.

However, the conventional telescoping gate brace has the following defects:

1. The installation process takes too much time.
2. The strength is weak, so the useful lifetime is short.
3. The components of the telescoping gate brace are hard to secure with each other.
4. The maximum loading is not enough and thus the conventional telescoping gate brace cannot be adapted to a heavy wooden gate.

To overcome the shortcomings, the present invention provides a telescoping gate brace to mitigate or obviate the aforementioned problems.

SUMMARY OF THE INVENTION

The main objective of the present invention is to provide a telescoping gate brace that is configured to be mounted on a wooden gate. The telescoping gate brace can bear a heavier wooden gate and has a more simple installation process.

The telescoping gate brace has a first rod, a second rod, a securing component, a first fixing assembly, a connector, and a second fixing assembly. The first rod has a first end and the second rod has a second end. The first rod and the second rod are movably sleeved with each other. The first end is away from the second rod and the second end is away from the first rod. The securing component is mounted on the first rod and the second rod, thereby securing a total length of the first rod and the second rod. The first fixing assembly is mounted on the first end and configured to be fixed on one of corners of the wooden gate. The connector is mounted on the second end. The second fixing assembly is mounted on the connector and configured to be mounted on another corner of the wooden gate. A distance between the second end and the second fixing assembly is adjustable via the connector.

With the first rod and the second rod sleeved with each other, the total length of the telescoping gate brace is easy to be adjusted, which also decreases the difficulty of the installation process and thus the installation is easier. Besides, the strength of the telescoping gate brace is improved, and thus the useful lifetime of the telescoping gate brace is longer and the telescoping gate brace can be adapted to a heavier wooden gate.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
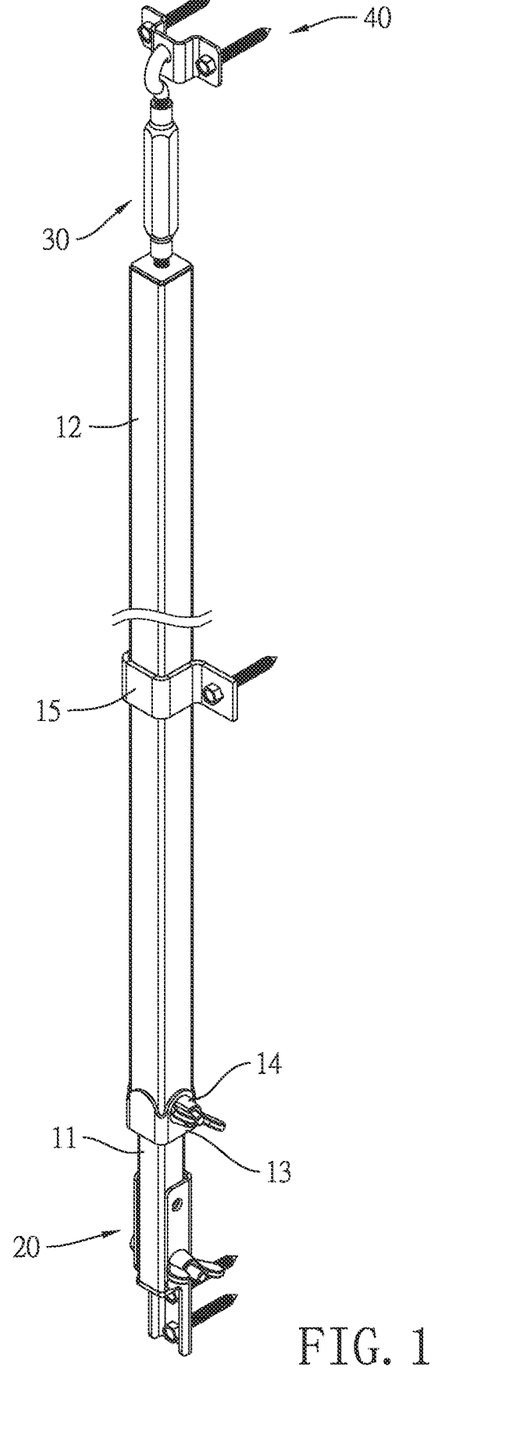
FIG. 1 is a perspective view of a telescoping gate brace in accordance with the present invention.
Figure 2:
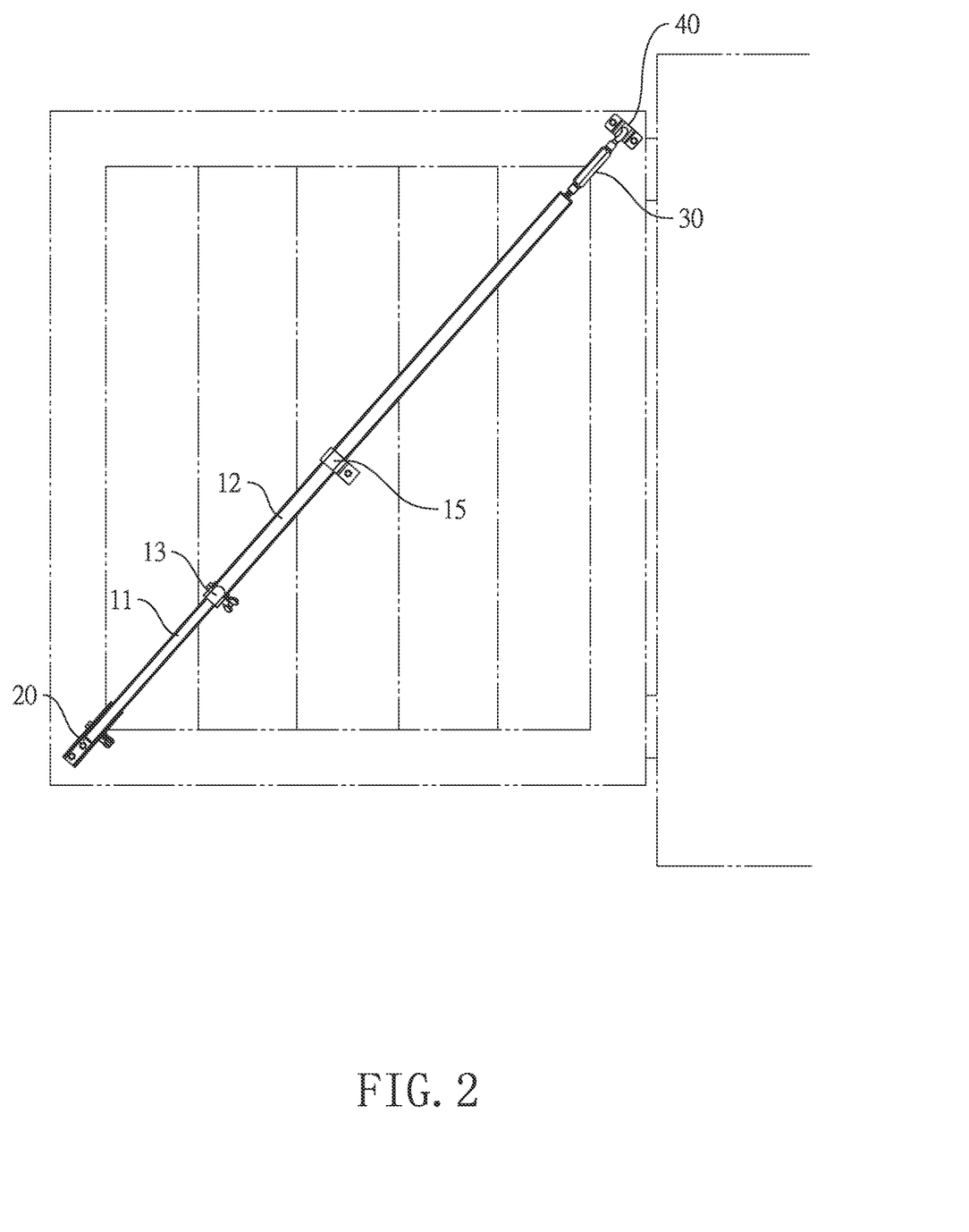
FIG. 2 is an operational schematic view of the telescoping gate brace in FIG. 1, shown with a wooden gate.

Please refer to FIG. 1 and FIG. 2. A telescoping gate brace is provided in accordance with the present invention and configured to be mounted on a wooden gate and thereby support the wooden gate. The wooden gate has two corners opposite each other, one is an upper corner and the other one is a lower corner.

Figure 3:
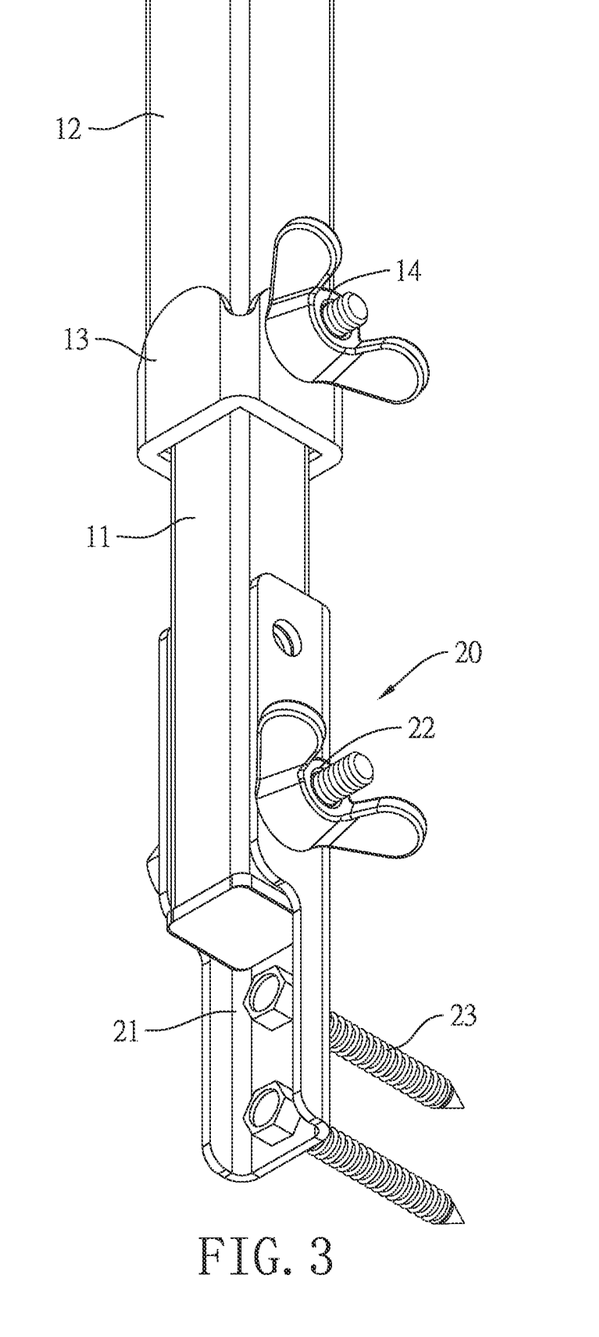
FIG. 3 is an enlarged view of a first end of the telescoping gate brace in FIG. 1.
Figure 4:
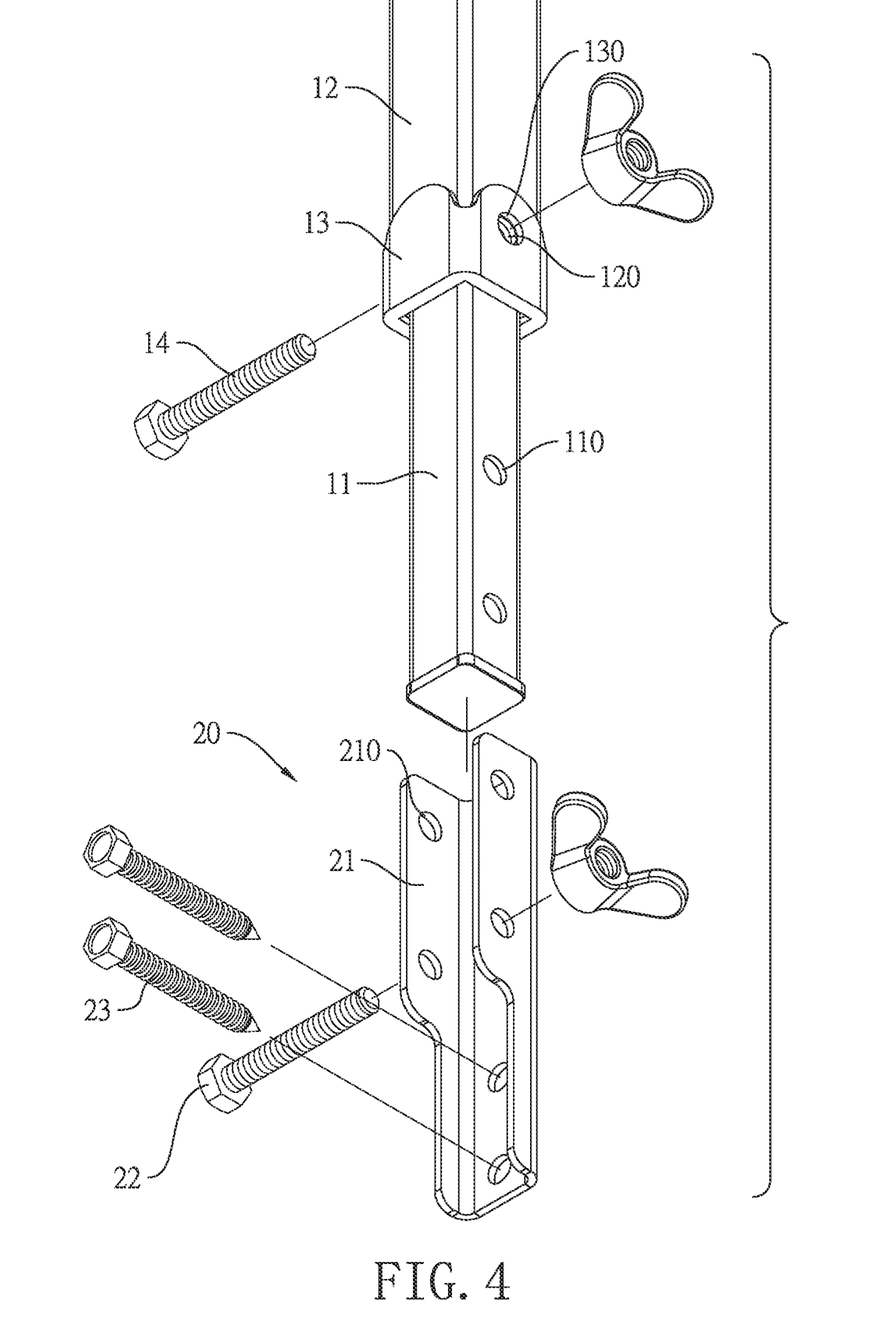
FIG. 4 is an exploded perspective view of the first end of the telescoping gate brace in FIG. 3.

Please refer to FIG. 3 and FIG. 4. The telescoping gate brace comprises a first rod 11, a second rod 12, a sleeve 13, a securing component 14, a first fixing assembly 20, a connector 30, and a second fixing assembly 40.

The first rod 11 has a first end and the second rod 12 has a second end. The first rod 11 and the second rod 12 are movably sleeved with each other, and the first end is away from the second rod 12 and the second end is away from the first rod 11. In this embodiment, the first rod 11 is sleeved in the second rod 12. It is not limited thereto, and the second rod 12 may be sleeved in the first rod 11 in another embodiment.

In this embodiment, the second rod 12 is hollow and thus the first rod 11 is movably mounted in the second rod 12. The first end of the first rod 11 is exposed from the second rod 12. Therefore, a total length of the first rod 11 and the second rod 12 is defined from the first end to the second end. In this embodiment, the first rod 11 has multiple first holes 110 and the second rod 12 has a second hole 120. The first holes 110 are arranged in a line parallel with the total length. After the first rod 11 is moved with respect to the second rod 12, one of the first holes 110 can align to the second hole 120.

The sleeve 13 is mounted on an end of the second rod 12. Said end is opposite the second end. The sleeve 13 surrounds the first rod 11. Therefore, at said end, the sleeve 13 may be located between the first rod 11 and the second rod 12 such that the first rod 11 may not contact the second rod 12. The sleeve 13 has a third hole 130 and the third hole 130 is aligned to the second hole 120 of the second rod 12. The first rod 11 and the second rod 12 may be made from metal, and the sleeve 13 may be made from plastic.

The securing component 14 is mounted on the first rod 11 and the second rod 12, thereby securing the total length of the first rod 11 and the second rod 12. Precisely, the securing component 14 is mounted in said one of the first holes 110, the second hole 120, and the third hole 130 and thereby the first rod 11 cannot move with respect to the second rod 12, which secures the total length of the first rod 11 and the second rod 12.

The first fixing assembly 20 is mounted on the first end and configured to be fixed on one of the corners of the wooden gate. In this embodiment, the first fixing assembly 20 comprises a first mounting component 21, a positioning component 22, and multiple first fixing components 23. The first mounting component 21 has multiple mounting holes 210. The mounting holes 210 are arranged in a line parallel with the first rod 11. After the first mounting component 21 is moved with respect to the first rod 11, one of the mounting holes 210 can align to the first hole 110. The positioning component 22 is mounted in one of the mounting holes 210 and one of the first holes 110 and thereby the first mounting component 21 cannot move with respect to the first rod 11, which secures the first rod 11 and the first mounting component 21.

A distance between adjacent two of the first holes 110 differs from a distance between adjacent two of the mounting holes 210. Therefore, to adjust the total length of the telescoping gate brace, moving the first rod 11 with respect to the second rod 12 and moving the first fixing assembly 20 with respect to the first rod 11 provide different effects.

The first fixing components 23 are mounted on the first mounting component 21 and configured to be mounted on the lower corner of the wooden gate. The first fixing components 23 are arranged in a line that is parallel with the first rod 11, in other words, parallel with a length direction of the telescoping gate brace. In another embodiment, it is not limited thereto, and the first fixing components 23 are arranged in a line that is perpendicular to the first rod 11.

Figure 5:
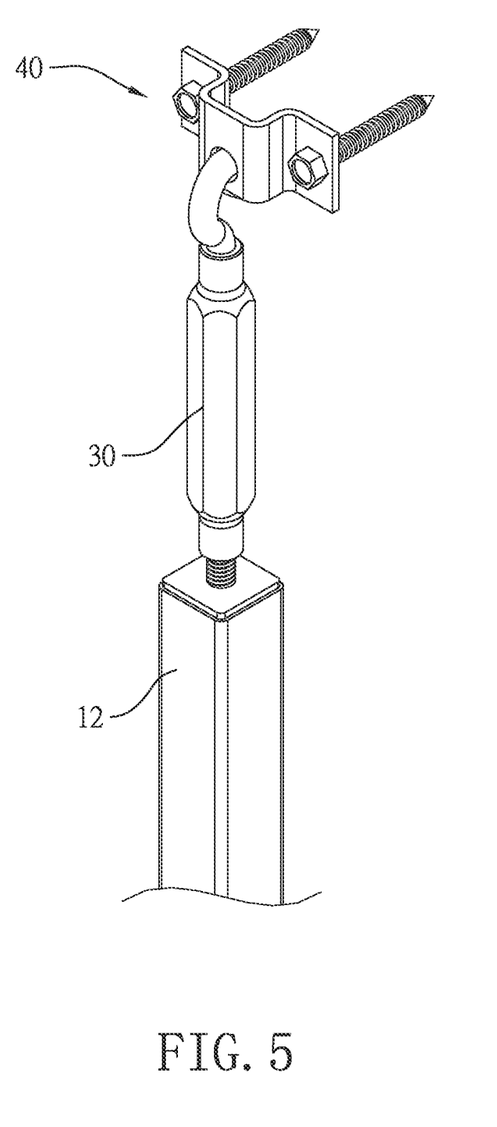
FIG. 5 is an enlarged view of a second end of the telescoping gate brace in FIG. 1.
Figure 6:
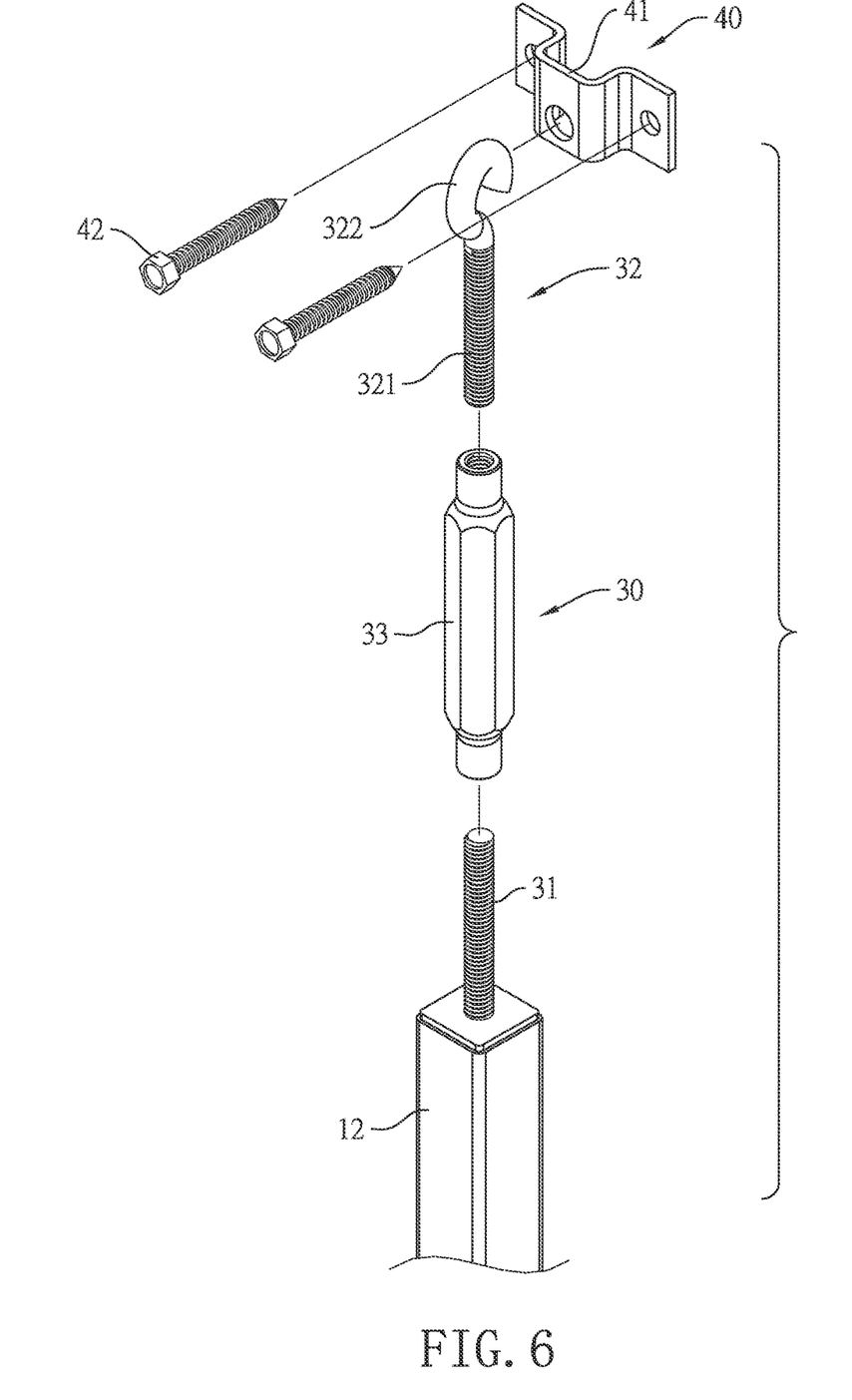
FIG. 6 is an exploded perspective view of the second end of the telescoping gate brace in FIG. 5.

Please refer to FIG. 5 and FIG. 6. The second fixing assembly 40 comprises a second mounting component 41 and multiple second fixing components 42. The second mounting component 41 is connected to the connector 30. The second fixing components 42 are mounted on the second mounting component 41 and configured to be mounted on the upper corner of the wooden gate. The second fixing components 42 are arranged in a line that is perpendicular to the second rod 12, in other words, perpendicular to the length direction of the telescoping gate brace. In another embodiment, it is not limited thereto, and the second fixing components 42 are arranged in a line that is parallel with the second rod 12.

The connector 30 is mounted on the second end of the second rod 12 and the second fixing assembly 40 is mounted on the connector 30. The second fixing assembly 40 is configured to be fixed on the other corner of the wooden gate. A distance between the second end and the second fixing assembly 40 is adjustable via the connector 30 and corresponds to the distance between the two corners of the wooden gate.

Precisely, the connector 30 comprises a fixed screwed rod 31, a detachable screwed rod 32, and a roller 33. The fixed screwed rod 31 is mounted on the second end. The detachable screwed rod 32 is mounted on the second fixing assembly 40 detachably. In this embodiment, the fixed screwed rod 31 is a straight rod and the detachable screwed rod 32 has a hook portion 321 and a straight portion 322, and a thread is formed on the straight portion 322.

The roller 33 is screwed on the fixed screwed rod 31 and the straight portion 322 of the detachable screwed rod 32. A distance between the fixed screwed rod 31 and the detachable screwed rod 32 is adjustable via rolling the roller 33, which also adjusts the distance between the second end and the second fixing assembly 40. In this embodiment, the roller 33 may be polygonal such that the roller 33 can be rolled by a wrench.

Figure 7:
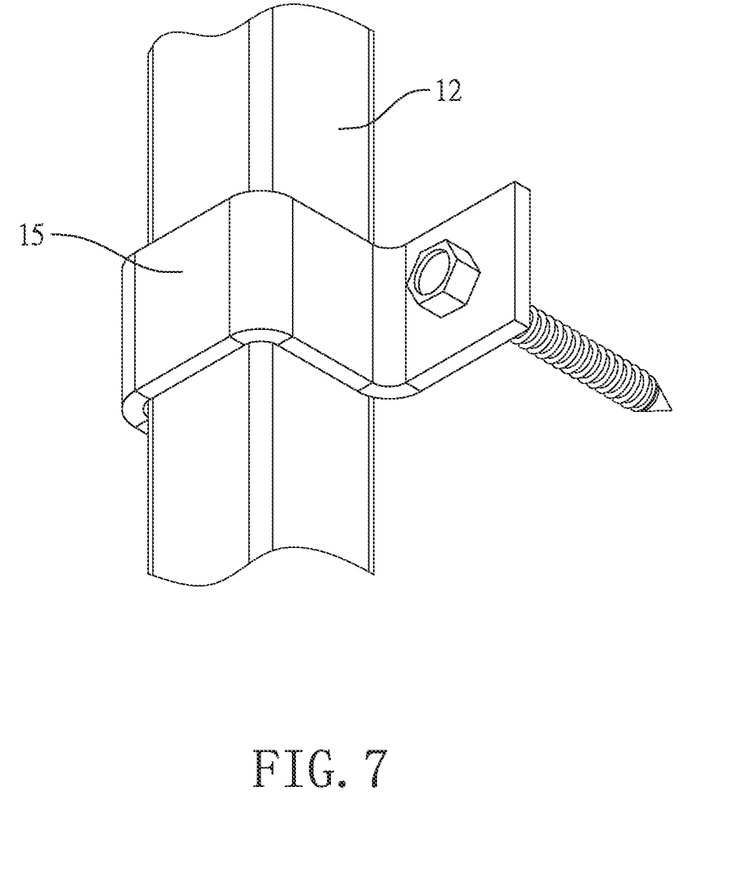
FIG. 7 is an enlarged view of a third mounting component of the telescoping gate brace in FIG. 1.

Then please refer to FIG. 1 and FIG. 7. The telescoping gate brace further has a third mounting component 15. The third mounting component 15 is mounted on the second rod 12, but it is not limited thereto; in another embodiment, the third mounting component 15 may be mounted on the first rod 11. The third mounting component 15 is configured to be fixed on the wooden gate and enhances the resistance to the lateral forces.

Please refer to FIG. 1 and FIG. 2 again. The telescoping gate brace can be installed through the following steps. Originally, the first fixing assembly 20 is already mounted on the first rod 11 and the connector 30 is already mounted on the second rod 12.

First, the first rod 11 or the second rod 12 is moved with respect to each other according to the diagonal length of the wooden gate and then the total length of the first rod 11 and the second rod 12 is secured by the securing component 14. If a total length of the telescoping gate brace cannot correspond to the diagonal length of the wooden gate, the first mounting component 21 can be moved with respect to the first rod 11 to adjust the total length of the telescoping gate brace.

Second, the second fixing assembly 40 is mounted on the upper corner of the wooden gate. Then, the connector 30 is mounted on the second fixing assembly 40 with the first rod 11 and the second rod 12.

Third, the first fixing assembly 20 is mounted on the lower corner of the wooden gate with the first rod 11 and the second rod 12. Thus, the total length of the telescoping gate brace is secured.

In another embodiment, the first fixing assembly 20 may be mounted on the upper corner and the second fixing assembly 40 may be mounted on the lower corner of the wooden gate. The first fixing components 23 and the second fixing components 42 may be self-tapping screws, but it is not limited thereto.

Third, the connector 30 is adjusted to tighten the telescoping gate brace. In this embodiment, the roller 33 is rolled by a wrench to tighten the telescoping gate brace and lift and support the wooden gate.

Consequently, with the aforementioned structures and processes, the present invention provides the following advantages:

The first rod 11 and the second rod 12 are sleeved with each other such that the total length of the telescoping gate brace is easy to be adjusted.

The adjustment is simplified, which also decreases the difficulty of the installation process and thus the installation is easier.

With the sleeve 13 sleeved on the second rod 12 and surrounding the first rod 11, noise generated during friction between the first rod 11 and the second rod 12 is decreased.

With the first fixing components 23 arranged in a line parallel with the first rod 11 or the second fixing component 42 arranged in a line perpendicular to the second rod 12, the strength of the fixing portions that are connected to the wooden gate is improved.

The strength of the telescoping gate brace is improved, and thus the useful lifetime of the telescoping gate brace is longer and the telescoping gate brace can be adapted to a heavier wooden gate.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A telescoping gate brace configured to be mounted on a wooden gate, the wooden gate having two corners opposite each other; the telescoping gate brace comprising:
    a first rod having a first end;
    a second rod having a second end, the first rod and the second rod movably sleeved with each other, and the first end being away from the second rod and the second end being away from the first rod;
    a securing component mounted on the first rod and the second rod, thereby securing a total length of the first rod and the second rod;
    a first fixing assembly mounted on the first end, wherein the first fixing assembly includes a separate mounting component configured to be fixed on one of the corners of the wooden gate by a separate fixing component;
    a connector mounted on the second end; and
    a second fixing assembly mounted on the connector, and configured to be mounted on the other corner of the wooden gate; a distance between the second end and the second fixing assembly being adjustable via the connector.

2. The telescoping gate brace as claimed in claim 1, wherein the connector comprises:
    a fixed screwed rod mounted on the second end;
    a detachable screwed rod detachably mounted on the second fixing assembly; and
    a roller screwed on the fixed screwed rod and the detachable screwed rod; wherein a distance between the fixed screwed rod and the detachable screwed rod is adjustable via rolling the roller.

3. The telescoping gate brace as claimed in claim 2, wherein:
    the second rod is a hollow rod and the first rod is sleeved in the second rod;
    the first rod has:
        a plurality of first holes arranged in a line;
    the second rod has:
        a second hole aligned to one of the first holes;
    the securing component is mounted in said one of the first holes and the second hole thereby securing the total length of the first rod and the second rod.

4. The telescoping gate brace as claimed in claim 3 further comprising:
    a sleeve mounted on an end of the second rod, said end opposite the second end, and the sleeve surrounding the first rod.

5. The telescoping gate brace as claimed in claim 4, wherein the sleeve forms:
    a third hole aligned to the second hole.

6. The telescoping gate brace as claimed in claim 5 further comprising:
    a mounting component mounted on the second rod.

7. The telescoping gate brace as claimed in claim 4, wherein the first fixing assembly comprises:
    a mounting component having a plurality of mounting holes arranged in a line; and
    a positioning component mounted in one of the mounting holes and mounted in one of the first holes, the positioning component securing the total length of the first rod and the mounting component.

8. The telescoping gate brace as claimed in claim 7, wherein a distance between two of the adjacent first holes differs from a distance between two of the adjacent mounting holes.

9. The telescoping gate brace as claimed in claim 8, wherein the first fixing assembly comprises:
    a plurality of fixing components mounted on the mounting component and configured to be mounted on the wooden gate; the fixing components of the first fixing assembly arranged in a line that is parallel with the first rod.

10. The telescoping gate brace as claimed in claim 9, wherein the second fixing assembly comprises:
    a mounting component connected to the connector; and
    a plurality of fixing components mounted on the mounting component and configured to be mounted on the wooden gate; the fixing components of the second fixing assembly arranged in a line that is perpendicular to the second rod.

11. The telescoping gate brace as claimed in claim 1, wherein:
    the second rod is a hollow rod and the first rod is sleeved in the second rod;
    the first rod has:
        a plurality of first holes arranged in a line;
    the second rod has:
        a second hole aligned to one of the first holes;
    the securing component is mounted in said one of the first holes and the second hole, thereby securing the total length of the first rod and the second rod.

12. The telescoping gate brace as claimed in claim 11 further comprising:
    a sleeve mounted on an end of the second rod, said end opposite the second end, and the sleeve surrounding the first rod.

13. The telescoping gate brace as claimed in claim 12, wherein the sleeve forms:
    a third hole aligned to the second hole.

14. The telescoping gate brace as claimed in claim 1 further comprising:
    a mounting component mounted on the second rod.

15. The telescoping gate brace as claimed in claim 1, wherein:
    the first rod has a plurality of first holes arranged in a line;
    the first fixing assembly comprises:
        a mounting component having a plurality of mounting holes arranged in a line; and
        a positioning component mounted in one of the mounting holes and mounted in one of the first holes, the positioning component securing the total length of the first rod and the second rod.

16. The telescoping gate brace as claimed in claim 15, wherein a distance between two of the adjacent first holes differs from a distance between two of the adjacent mounting holes.

17. The telescoping gate brace as claimed in claim 15, wherein the first fixing assembly comprises:
- a plurality of fixing components mounted on the mounting component and configured to be mounted on the wooden gate; the fixing components of the first fixing assembly arranged in a line that is parallel with the first rod.

18. The telescoping gate brace as claimed in claim 1, wherein the second fixing assembly comprises:
- a mounting component connected to the connector; and
- a plurality of fixing components mounted on the mounting component and configured to be mounted on the wooden gate; the fixing components of the second fixing assembly arranged in a line that is perpendicular to the second rod.

19. A telescoping gate brace configured to be mounted on a wooden gate, the wooden gate having two corners opposite each other, the telescoping gate brace comprising:
- a first rod having a first end including a plurality of first holes;
- a second rod having a second end, the first rod and the second rod movably sleeved with each other, and the first end being away from the second rod and the second end being away from the first rod;
- a securing component mounted on the first rod and the second rod, thereby securing a total length of the first rod and the second rod;
- a first fixing assembly mounted on the first end, wherein the first fixing assembly includes a separate mounting component configured to be fixed on one of the corners of the wooden gate, the mounting component includes a plurality of second holes, and a distance between two adjacent first holes differs from a distance between two adjacent second holes;
- a connector mounted on the second end; and
- a second fixing assembly mounted on the connector and configured to be mounted on the other corner of the wooden gate, a distance between the second end and the second fixing assembly being adjustable via the connector.

* * * * *